United States Patent [19]

Pacholok

[11] Patent Number: 4,472,672
[45] Date of Patent: Sep. 18, 1984

[54] HIGH POWER FACTOR SWITCHING-TYPE BATTERY CHARGER

[75] Inventor: David R. Pacholok, Elgin, Ill.

[73] Assignee: Motorola Inc., Schaumburg, Ill.

[21] Appl. No.: 449,034

[22] Filed: Dec. 13, 1982

[51] Int. Cl.³ .......................... H02J 7/00; H02M 7/00
[52] U.S. Cl. ....................................... 320/21; 320/32; 320/35; 320/39; 363/41; 363/124
[58] Field of Search ...................... 320/20, 21, 39, 53, 320/32, 35; 323/210, 242, 288; 363/124

[56] References Cited

U.S. PATENT DOCUMENTS

| | | | |
|---|---|---|---|
| 3,068,392 | 12/1962 | Santelmann, Jr. | 363/89 |
| 3,419,792 | 12/1968 | Kasper et al. | 323/209 |
| 3,629,681 | 12/1971 | Gurwicz | 320/21 X |
| 3,731,183 | 5/1973 | Johnson et al. | 307/104 X |
| 3,821,635 | 6/1974 | Kimmel et al. | 323/242 |
| 3,876,921 | 4/1975 | Bigbee | 320/21 X |
| 4,087,733 | 5/1978 | Casagrande | 320/21 |
| 4,160,945 | 7/1979 | Schorr | 323/288 |
| 4,242,627 | 12/1980 | Kisiel | 320/21 |
| 4,321,523 | 3/1982 | Hammel | 320/14 |
| 4,339,705 | 7/1982 | Kelley | 323/210 |
| 4,384,321 | 5/1983 | Rippel | 320/21 X |

Primary Examiner—R. J. Hickey
Attorney, Agent, or Firm—Donald B. Southard; James W. Gillman; Edward M. Roney

[57] ABSTRACT

A switching-type charging circuit is described wherein the power factor of the circuit has been optimized. The switching-type charging circuit utilizes a dual loop feedback system to control the input and output current of the circuit. The dual feedback loop system utilizes a sinusoidal voltage reference in conjunction with a pulse width modulation circuit to force the input impedance of the circuit to appear substantially purely resistive.

7 Claims, 3 Drawing Figures

HIGH POWER FACTOR SWITCHING-TYPE BATTERY CHARGER

BACKGROUND OF THE INVENTION

1. Field of Invention

This invention relates to the field of switching-type battery chargers and specifically to a high power factor battery charger which is suitable for use in charging systems wherein a high output power and relatively small size is necessary.

2. Description of the Prior Art

Switching-type power supplies are noted for their high-efficiency, light weight, and probable long term cost advantages as copper and steel rise in price. Switching-type power supplies are especially useful in applications where heat dissipation and size are important.

Typically, a switching power supply achieves voltage regulation through the use of a solid state switch, such as a transistor, which is gated on or off according to the power requirement of the load. This technique known as duty cycle regulation is quite efficient as power is delivered to the load in proportion to power requirement of the load. The power delivered to the load will then be the average power of the pulse train at the output of the switching device. This technique eliminates the need for bulky and expensive power transformers and large heatsinks required by series pass transistors in an analog charging circuit.

A major problem with conventional switching-type charging circuits arises when circuits are used in high power applications. Switching type charging circuits typically have low-power factors. The power factor of a device describes the relationship of the relative phase of the input current and voltage when excited by an AC voltage and quantifies electrical losses which occur in a capacitive or inductive circuit. The power factor can be thought of as the ratio of the effective series resistance of a device to the complex impedance of the device and is expressed as a percent. A purely resistive device would have a unity power factor. Conventional switching-type charging circuits may have a power factor of 65% due to a widely varying input current demand and the constantly changing input voltage of an AC signal.

The relatively low-power factor of a switching-type battery charger becomes a problem when large amounts of power are required by a load.

As an example, suppose 1,000 watts DC were required from a supply to be operated from a 115 V AC, 15 A service. A typical switching-type charging circuit would run with a conversion efficiency of approximately 85 percent. Therefore, the power demand of this device would be 1,176 W. With a power factor of 65% the volt-ampere input to the device would be 1,809 VA. This translates to an input current of 15.73 amperes or 0.73 amps above the capacity of the supply service. If the power factor of switching device was near unity, the device would draw approximately 10.5 amperes and, therefore, be operable from the intended service.

For the foregoing and other shortcomings and problems, there has been a long-felt need to optimize the power factor of a switching-type charging circuit while maintaining the high efficiency, cool operation and relatively small size of the device.

SUMMARY OF THE INVENTION

Accordingly, it is an object of the present invention to provide a switching-type battery charging circuit which can provide a charging current while operating efficiently and maintain a high-power factor.

It is a further object of this invention to provide a switching-type charging circuit which will efficiently accomodate fluctuations in the AC power source line, as well as changing current demands of a load.

It is yet a further object of the present invention to increase the reliability of switching-type charging circuits by eliminating the need for large, expensive electrolytic capacitors.

Briefly described, the invention contemplates a switching-type charging supply which incorporates a dual loop feedback system to optimize the power factor of the circuit. The first feedback loop is responsive to an electronically variable full wave rectified AC voltage reference and a signal related to the level of the current output of the charging circuit for controlling the pulse width modulation circuit. The second feedback loop is responsive to a signal related to the level of the current output of the charging supply, as well as the battery voltage and temperature for controlling the amplitude of the electronically variable voltage reference.

DETAILED DESCRIPTION OF THE PREFERRED EMBODIMENT

Figure 1:
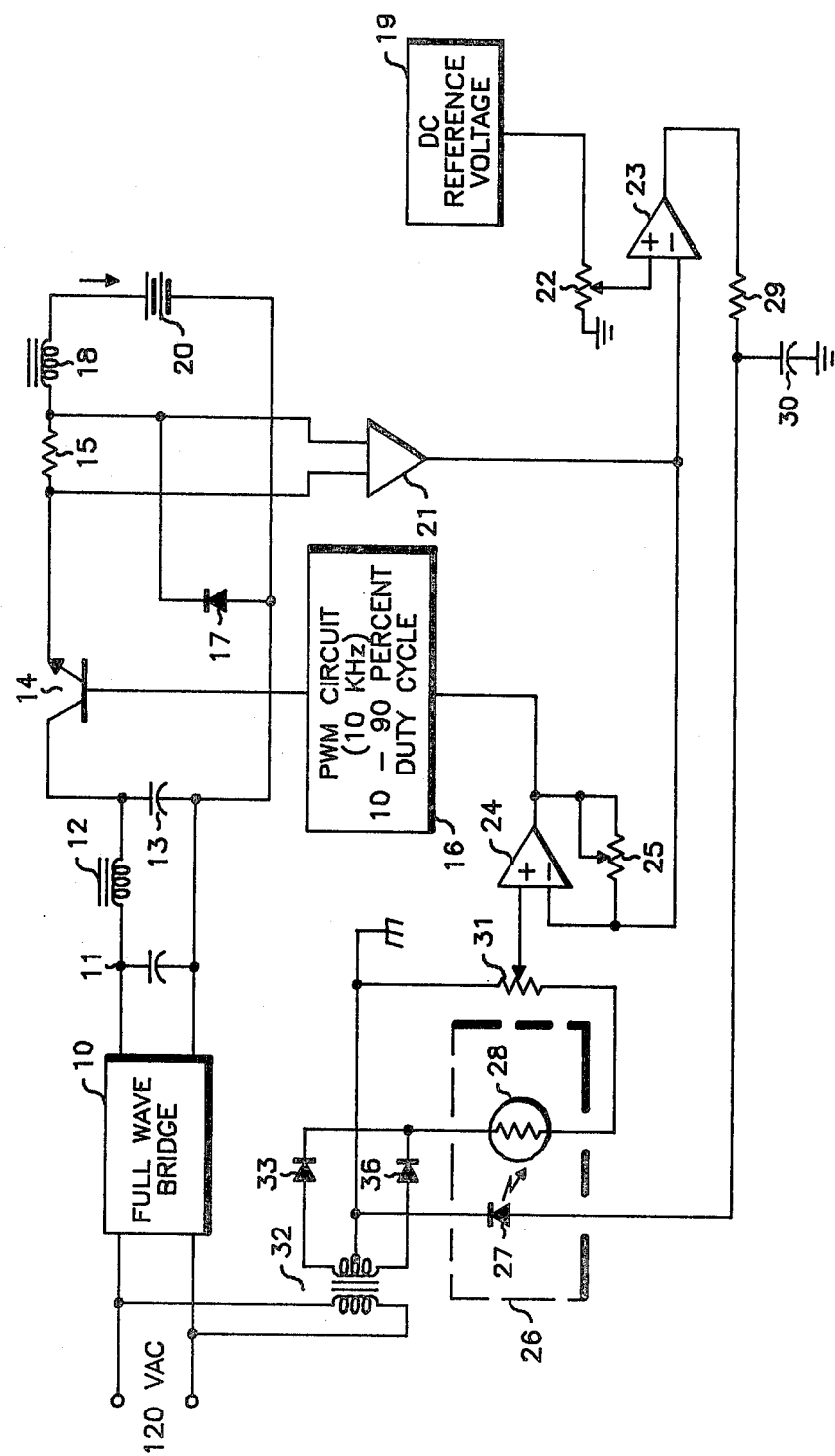
FIG. 1 is a block diagram of the high power factor switching-type battery charger supply.

FIG. 1 shows a block diagram of the preferred embodiment of the present invention. The high-power factor switching-type battery charger supply consists of a conventional pulse width modulation circuit 16 which operates in conjunction with several novel circuits. The circuit is designed to operate from a standard 120 V 60-cycle AC input. The 120 V input signal is connected to a full wave rectifier circuit 10 and a transformer 32. The full wave rectifier circuit 10 provides power for the switching transistor output device 14, and the transformer 32 provides stepped down voltage to generate the sinusoidal voltage reference and power to the remainder of the devices used in this circuit. The output of the full wave bridge circuit 10 is connected to a capacitor 11, an inductor 12 and a capacitor 13 which provide filtering to the output of the full wave bridge circuit 10 which prevents radio frequency signals generated by the switching circuit from entering the AC source line.

The filtered output of the full wave bridge circuit 10 is then connected to the collector of a switching transistor 14. The base of transistor 14 is controlled by the pulse width modulation circuit 16 which will be discussed in more detail later. The pulse width modulated output of transistor 14 is then connected to a resistor 15 and an inductor 18. Inductor 18 acts as an energy storage device which provides a continuous charging current flow to the battery 20 during the "off" cycles of transistor 14. Resistor 15 provides a means of generating a signal related to output current flow for controlling a feedback amplifier 21 responsive to the level of the output charging current. A freewheeling diode 17 is connected between the negative terminal of battery 20 and the junction of resistor 15 and inductor 18. The diode 17 provides protection from inductive impulses created by the overall switching circuit and the load.

Resistor 15 is connected to an amplifier 21 as illustrated which amplifier generates a voltage related to the current level at the output of the charging supply.

The output of amplifier 21 is connected to an input of amplifiers 24 and 23, as shown. Amplifier 24 has a second input which is connected to a variable resistor 31 which provides a rectified sinusoidal voltage reference for the amplifier 24.

The transformer 32 has an output terminal connected to a diode 33. The transformer 32 has a center tap on the output side which is connected to chassis ground. The transformer 32 also has another output terminal connected to a diode 36. Transformer 32 is designed to convert the 120 V input waveform to a 12 V level. Diodes 33 and 36 provide a full wave rectified sinusoidal waveform which is then applied to a photosensitive resistor 28. The photosensitive resistor 28 is then applied through variable resistor 31 to chassis ground.

The output of amplifier 21 is also connected to an input of amplifier 23. A second input of amplifier 23 is connected to a variable resistor 22. Resistor 22 is connected to a circuit 19 which generates a reference voltage related to battery cell voltage and temperature, and this will be discussed in more detail later. The output of amplifier 23 is connected to a resistor 29 and capacitor 30. The capacitor 30 and resistor 29 form a low pass filter which removes high frequency information from the output of amplifier 23 and have the effect of slowing the response time of this feedback loop. Resistor 29 and capacitor 30 are connected to a light emitting diode 27 which has its remote terminal connected to ground.

The photosensitive resistor 28 is responsive to the output of the light emitting diode 27 and has the effect of controlling the amplitude of the positive-going sinusoidal voltage reference developed across resistor 31. The light emitting diode 27 and resistor 28 comprise a device known as an opto-isolator 26 (shown in dotted line) and may be of the type VPH101 available from Vactrol.

The pulse width modulation circuit 16 creates a variable pulse-width signal which is responsive to the voltage output of amplifier 24. A rising voltage at the output of the amplifier 24 has effect of increasing the pulse width at the base of transistor 14.

In operation, the transistor 14 is switched on or off by the pulse-width modulation circuit 16. The pulse-width modulation circuit 16 generates a pulse width in response to the constantly changing AC voltage reference, as well as the current demands of the load. The operating frequency of the pulse-width modulation circuit is approximately 10 kHz and is many times the frequency of the AC input to the circuit. Therefore, at the beginning of the AC cycle, the pulse-width modulation circuit 16 will generate a relatively long duty cycle, and as the AC voltage increases, the duty cycle is shortened. This characteristic has the effect of keeping the current and voltage at the input to the circuit nearly in phase. As the AC input voltage to the circuit rises, more current is available to the switching transistor and, therefore, less "on" time is required by the switching transistor to keep the power to the load constant.

The rectified sinusoidal voltage reference is responsive to the amount of current being delivered by charging circuit to the load. As the battery voltage increases, the current to the light emitting diode 27 is decreased, and the decreased light output causes the resistance of the photosensitive resistor 28 to increase which, in turn, lowers the amplitude of the voltage reference across resistance 31. The lower amplitude of this voltage reference results in a shorter "on" time for the switching transistor 14, thereby reducing the power delivered to the load.

Figure 2:
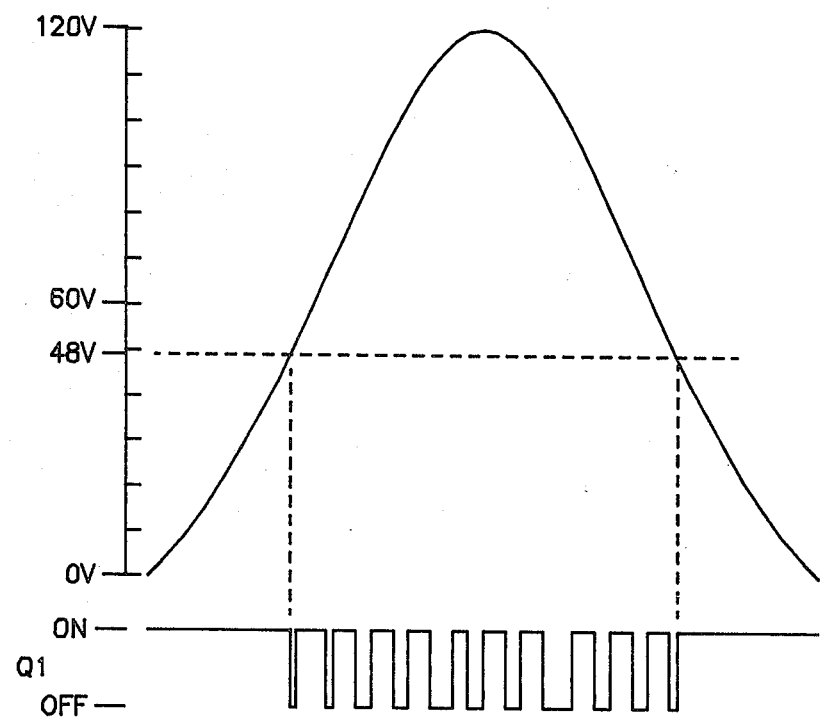
FIG. 2 is a graph demonstrating the relationship between the input AC waveform and the waveform used to control the switching transistor used in the charging circuit.

FIG. 2 is a graph depicting the relationship between one-half cycle of the 120 volt AC input waveform and the output of the pulse-width modulation circuit 16. This graph demonstrates a possible waveform which would be generated if the switching-type charging circuit 16 was configured to charge a 48 volt battery. During the initial phase of the AC input waveform, the input voltage of the charging circuit 16 starts at 0V and begins to rise. The switching transistor 14 remains on until the input voltage reaches approximately 48 V and then switches off for a short time. The transistor then switches on and off with the "on" time of the transistor becoming shorter until the AC waveform reaches its maximum voltage. As the AC voltage begins decreasing, the "on" time of the transistor 14 becomes increasingly long until the AC voltage again reaches 48 volts. The switching transistor 14 will then remain on until the AC voltage again rises above 48 volts. The pulse-width modulation circuit 16 operates at approximately 10 kHz, and this provides a minimum "on" or "off" time of approximately 10 microseconds. The actual combination of "on" or "off" cycles will depend on the output current of the charging circuit and the temperature of the battery. Fluctuations in the peak voltage of the AC input line will also be compensated by the pulse-width modulation circuit 16.

Figure 3:
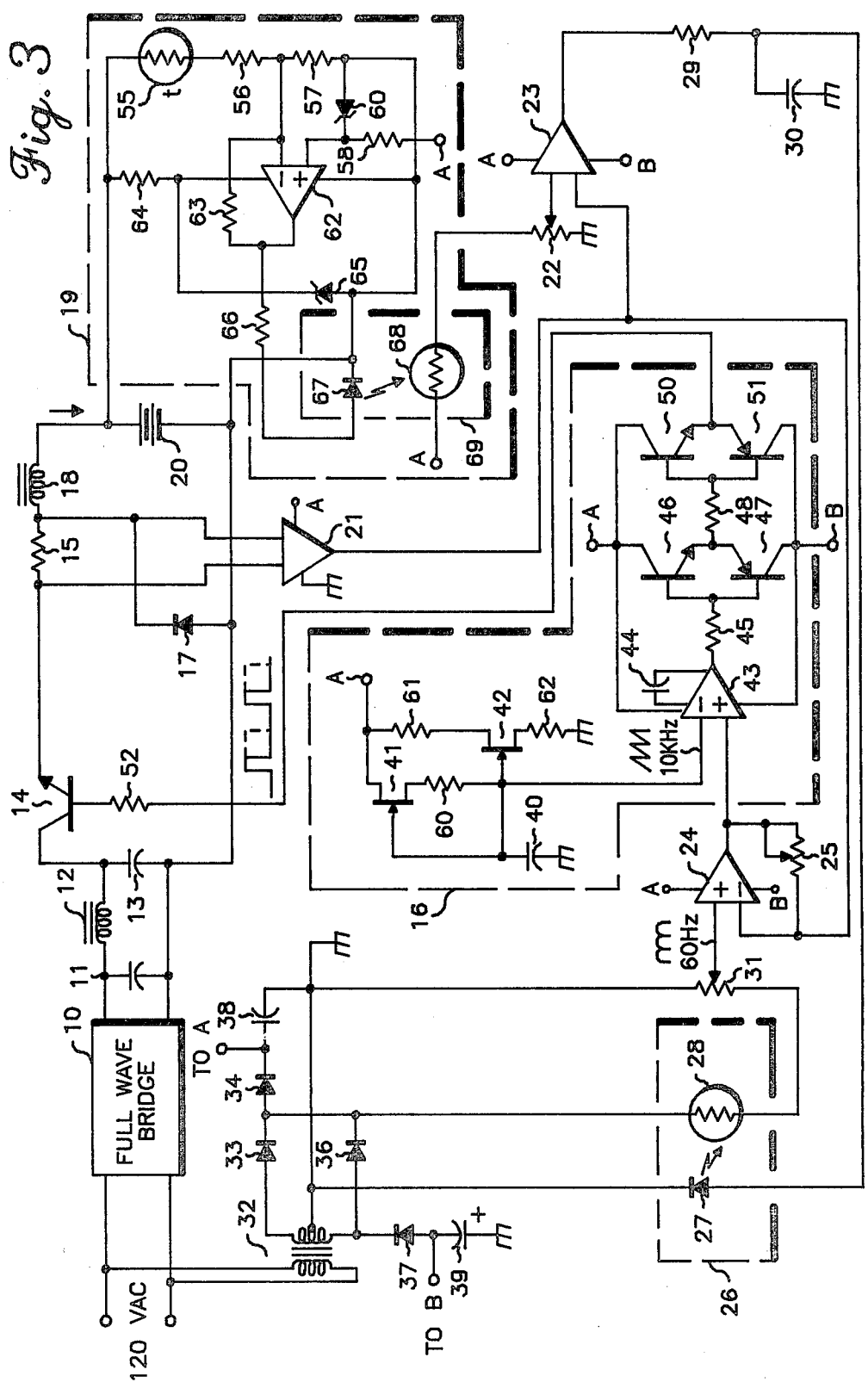
FIG. 3 is a detailed electrical schematic of the circuit of FIG. 1.

FIG. 3 shows an electrical schematic of the high-power factor switching-type charging circuit supply. In addition to the components previously described in FIG. 1, the low voltage power supply, the pulse-width modulation circuit 16 and the DC voltage reference circuit 19 are shown in greater detail.

The low voltage power supply comprises a diode 34 which is connected to diodes 33 and 36. The second terminal of diode 34 is connected to a terminal A and to a capacitor 38. The second terminal of capacitor 38 is connected to chassis ground. Terminal A provides a positive voltage of approximately 10 volts and is used to provide the positive voltage to the various amplifiers and circuits used in the dual feedback loop system. Some of these circuits also require a negative voltage which is provided by a diode 37 and capacitor 39. The negative voltage is developed at terminal B which is then connected to the amplifiers which require a negative voltage.

The pulse-width modulation circuit 16 comprises a ramp generator formed by unijunction transistors 41 and 42, a comparator 43 and a drive circuit formed by transistors 46, 47, 50 and 51.

In operation, the capacitor 40 begins to charge at a constant rate with a current supplied by the current source formed by the unijunction transistor 41 and resistor 60. The capacitor voltage rises linearly until the capacitor voltage reaches the turn-on threshold of unijunction transistor 42. When transistor 42 switches to a conducting state, current flows through the base of transistor 42 until capacitor 40 is completely discharged. The cycle then repeats continuously, thereby creating a ramp or saw-tooth waveform. The output of the ramp generator circuit is then connected to comparator 43. The comparator is a standard operational amplifier circuit which operates without feedback. The capacitor 44 provides compensation for the operational amplifier circuit.

The amplifier 24 is connected to a second input terminal of comparator 43. The comparator 43 will have an output which is either high or lower depending on the relative output voltage of the ramp generator and the output voltage of amplifier 24. The output signal created by comparator will then be a square wave of variable duty cycle responsive to the sinusoidal voltage reference and the output current requirement of the charging circuit.

The output of comparator 43 is then coupled to transistors 46 and 47 through a resistor 45. The emitters of transistors 46 and 47 are coupled to the bases of transistors 50 and 51 through resistor 48. The emitters of transistors 50 and 51 are coupled to the switching transistor 14 through resistor 52. The transistors 46, 47, 50 and 51 are of the general switching class of transistors and are designed to increase the output current of comparator 43 to a level required by switching transistor 14. The terminals A and B provide power to the comparator and the associated output transistors.

The comparator 43 can be of the type LM318 available from several manufacturers and the output transistors can be of the general class of switching transistors.

The amplifier 23 generates a signal which is related to the output current of the regulator, as well as the temperature and voltage of the battery under charge. The amplifier 23 is connected to the output of amplifier 21 which is a signal related to the output current of the charging circuit. The amplifier 23 also has an input connected to a variable resistor 22 which in turn is connected to a DC voltage reference circuit 19.

The DC voltage reference circuit 19 generates a reference voltage which is related to the battery voltage and temperature. The battery under charge is coupled to a temperature sensitive resistor 55 which is in physical contact with the battery. The battery is also connected to a resistor 64. The temperature sensitive resistor 55 is coupled to a resistor 56 which in turn is coupled to a resistor 57. The second terminal of resistor 57 is coupled to the negative terminal of the battery 20. The resistors 55, 56 and 57 comprise a resistive divider network and provide a reduced voltage which is compatible with the input of amplifier 62. The junction of resistors 56 and 57 provide an input to amplifier 62. This junction is also connected to a resistor 63. The resistor 63 is also connected to the output of amplifier 62 which provides a feedback path to control the gain of amplifier 62. The second input terminal of amplifier 62 is connected to a resistor 58 and a zener diode 60. The resistor 58 also has a terminal connected to the low voltage power supply A. Resistor 58 and diode 60 provide a fixed voltage reference for amplifier 62.

The amplifier 62 is connected to a zener diode 65 and a resistor 64. The zener diode also has a connection to the negative terminal of the battery 20. These components provide a power source for amplifier 62 which is independent of the actual battery voltage.

The output of amplifier 62 is coupled to a resistor 66. The resistor 66 is then coupled to an opto-isolator 69. The opto-isolator 69 is identical to opto-isolator 26. The output of amplifier 62 controls the intensity of light-emitting diode 67 which in turn controls the resistance of the photo-sensitive resistor 68. The photo-sensitive resistor is coupled to the positive low voltage power source A. The opto-isolator is required to isolate the operating potential of the DC voltage reference circuit from the lower operating potential of amplifier 23.

Thus the charging voltage of battery 20 is converted to a level compatible with the voltage regulator loop. Through this loop, the temperature and voltage of battery 20 control the amplitude of the sinusoidal voltage reference, which in turn, scales the output current of the charging circuit.

The foregoing embodiment has been intended as an illustration of the principles of the present invention. Accordingly, other modifications, uses and embodiments will be apparent to one skilled in the art without departing from the spirit and scope of the principles of the present invention.

What is claimed is:

1. An improved switching-type charging circuit operated from an AC power source for charging a battery wherein the operating power factor is optimized and further wherein the charging circuit includes a pulse width modulation circuit controlling a switching transistor together with a current sensing means, said charging circuit including in combination:
   an electronically variable sinusoidal voltage reference means coupled to the AC input means;
   a D.C. voltage reference means for generating a reference voltage related to the battery voltage and temperature;
   a first feedback loop responsive to said current sensing means and said D.C. voltage reference means for controlling said electronically variable sinusoidal voltage reference means; and
   a second feedback loop means responsive to said current sense means and said electronically variable voltage reference means for controlling said pulse width modulation circuit.

2. A method for optimizing power factor when using a switching-type power supply operating from an AC power source, for charging a battery, and having a pulse width modulation circuit controlling a switching transistor together with a current sensing means, including in combination:
   deriving an electronically-variable sinusoidal voltage reference from the AC input means;
   generating a DC voltage reference related to the battery voltage and temperature;
   utilizing a first feedback loop responsive to said DC voltage reference and said current sensing means to control said electronically variable sinusoidal voltage reference means; and
   utilizing a second feedback loop, responsive to said current sense means and said electronically variable voltage reference means to control said pulse width modulation circuit.

3. The circuit of claim 1 wherein said current sense means includes resistor and an operational amplifier.

4. The circuit of claim 1 wherein said electronically variable sinusoidal voltage reference includes a transformer, a resistor and an opto-isolator.

5. The circuit of claim 1 wherein said pulse-width modulation circuit includes a ramp generator, a comparator and an error amplifier.

6. The circuit of claim 1 wherein the DC voltage reference includes an operational amplifier, a thermistor, a zener diode and a resistor divider network.

7. The circuit of claim 1 wherein the DC voltage reference is optically isolated from the first feedback loop.

* * * * *